ates Patent
United States Patent
Pagella et al.

[11] 3,710,659
[45] Jan. 16, 1973

[54] AUTOMATICALLY CONTROLLED TOOL HOLDING DEVICE

[75] Inventors: Elio Pagella; Carlo Guerci, both of Ivrea, Italy

[73] Assignee: Ing. C. Olivetti & C. S. p. A., Ivrea (Turin), Italy

[22] Filed: March 2, 1970

[21] Appl. No.: 15,390

[30] Foreign Application Priority Data

March 4, 1969 Italy..................................50834 A/69

[52] U.S. Cl. .......................................82/1.2, 82/2 E
[51] Int. Cl. ..............................................B23b 41/00
[58] Field of Search............82/2 E, 2 B, 1.2; 408/125

[56] References Cited

UNITED STATES PATENTS

| | | | |
|---|---|---|---|
| 2,356,651 | 8/1944 | Chandler | 82/2 E |
| 3,226,649 | 12/1965 | Kelling | 82/2 B |
| 3,174,367 | 3/1965 | Lukens | 82/2 B |

FOREIGN PATENTS OR APPLICATIONS

| | | | |
|---|---|---|---|
| 1,230,648 | 12/1966 | Germany | 82/2 E |
| 351,015 | 2/1961 | Switzerland | 82/2 E |

Primary Examiner—Leonidas Vlachos
Attorney—Birch, Swindler, McKie & Beckett

[57] ABSTRACT

A tool holding device wherein the tool is slideably supported in the holder in order to enable a radial motion with respect to the axis of rotation of the holding device to be described. Control of the holder is effected by a control circuit which rapidly positions the tool for commencement of the machining operation and then controls the tool more slowly during the machining operation. A step motor is used as the motion source and is controlled directly by the control circuit.

14 Claims, 5 Drawing Figures

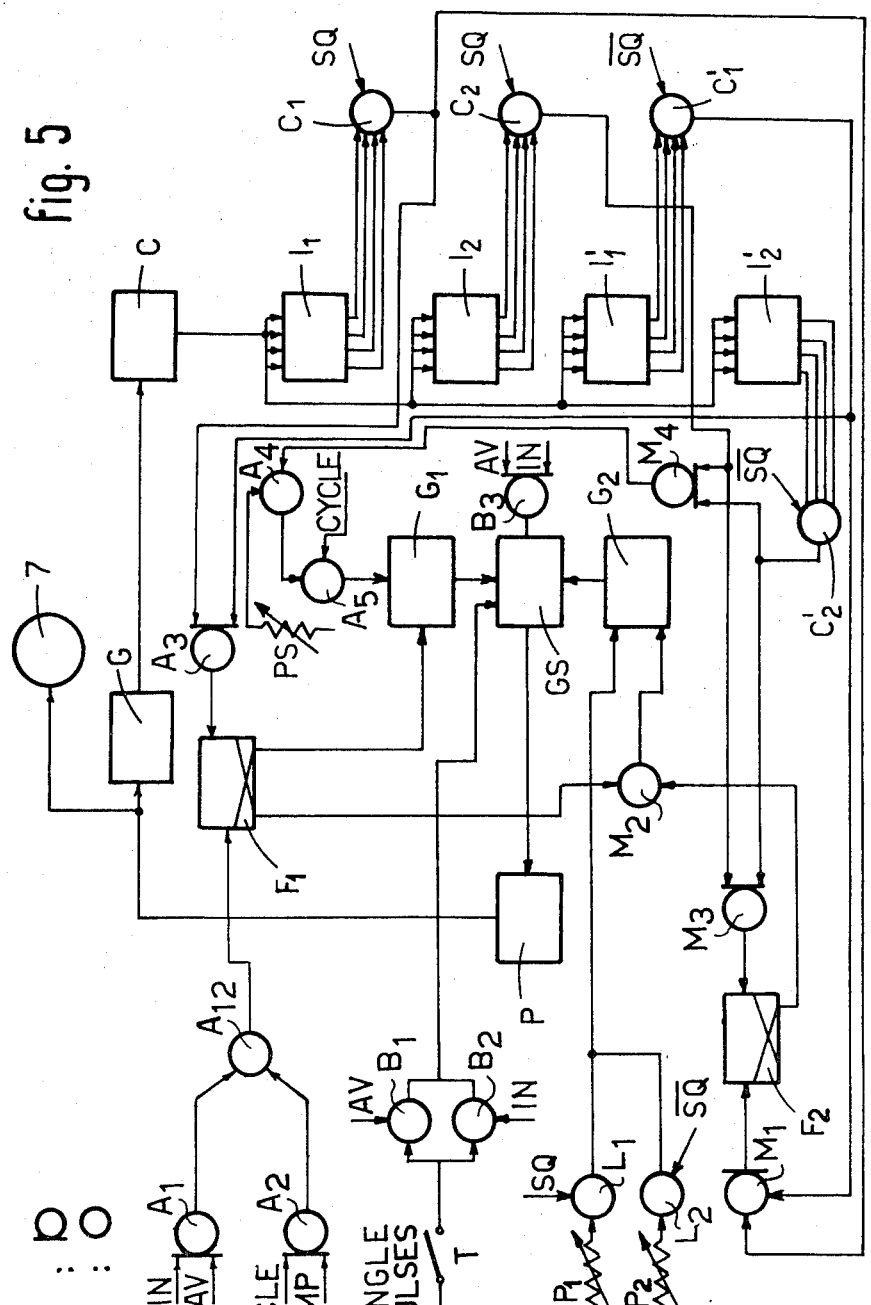

AUTOMATICALLY CONTROLLED TOOL HOLDING DEVICE

REFERENCE TO RELATED APPLICATIONS

Applicants claim priority from corresponding Italian patent application Ser. No. 50834-A/69 filed Mar. 4, 1969.

BACKGROUND OF THE INVENTION

This invention relates to a tool holding device which is adapted to be mounted on the rotating spindle of a machine tool. The device can be used for cutting grooves, facing and other operations using a numerically controlled machine tool. The tool enables performance of a complete working cycle in a fully automatic manner.

Known tool holding devices usually include a rotary member which is mounted directly on the spindle of the machine tool and which is provided with a toolslide capable of a radial motion with respect to the axis of rotation of the rotary member and a stationary portion which is fixed to the machine tool.

The radial movement of the slide, which slides on guides provided on the rotary member of the device, is normally generated by a screw and nut screw assembly, one element of which is firmly fastened to the slide while the other is axially secured to the rotary member and is caused to rotate by suitable drive means.

Existing devices can be equipped with one of two known types of driving mechanism. In a first known type of arrangement, the drive mechanism includes an epicyclic gear train which is disposed between the rotary and the stationary members of the tool holding device. Motion is transmitted to a screw or nut which forms a part of the drive assembly, by a sun wheel of the epicyclic gear train. The sun wheel is driven by a plurality of planetary gears, or planet wheels, carried by a planet carrier to which rotary motion can be imparted either by manually actuated means provided at the outside of the drive or by gears driven by the spindler of the machine tool. When the planet carrier is held stationary with respect to the machine tool, the toolslide remains motionless relative to the rotary member of the device. When the planet carrier is caused to rotate, the movement is transmitted to the slide and radial motion of the slide is effected.

According to a second arrangement, the drive means includes gear wheels of various shapes, which are carried by the rotary member of the device. The gear wheels are equipped with teeth adapted to coact with suitable pins or protruding portions integral with the stationary portion of the device.

The tool holding devices of the kind described are subject to several drawbacks. Firstly, the radial traverse speed of the slide with respect to the rotary member of the holding device is dependent upon the speed of rotation of the tool around the axis of the spindle of the machine. That is the feed speed and the cutting speed are related. Furthermore, the cutting speed is not continuously adjustable, because the drive mechanism described above is capable of only limited variations in the cutting speed. Because the feed speed and cutting speed are related it is impossible to select the most efficient speed for each function and the efficiency of the system is severely decreased.

Another disadvantage stems from the fact that in order to start the radial movement of the tool a manual intervention of the operator directly on the machine is required. Known tool holding devices of the kind described accordingly do not suitably lend themselves to usages with numerically controlled machine tools because it is impossible to accomplish a complete working cycle automatically.

Finally, the tool holding devices of the prior art are mechanically complex and therefore delicate, and include a great number of moving parts or components (i.e. gear trains, epicyclic trains, etc.) which are subjected to severe stresses, repeated impacts, rubbing, etc.

SUMMARY OF THE INVENTION

The object of the present invention is to obviate the drawbacks mentioned above with respect to the prior art devices and to provide a simple tool-holding mechanism which is useful with fully automatic numerically controlled equipment.

The invention provides a tool holding device, wherein the tool is secured to a slide which is movable radially with respect to a body member, which in turn is adapted for mounting on the machine tool and is rotated thereby. A reversible electric motor is mounted integral with the body member and generates the said radial motion of the slide.

BRIEF DESCRIPTION OF THE DRAWINGS

A preferred embodiment of the invention is described, by way of example, with reference to the accompanying drawings, wherein:

FIG. 5 is a circuit diagram for control circuit of the invention.

DETAILED DESCRIPTION OF THE INVENTION

Figure 1:
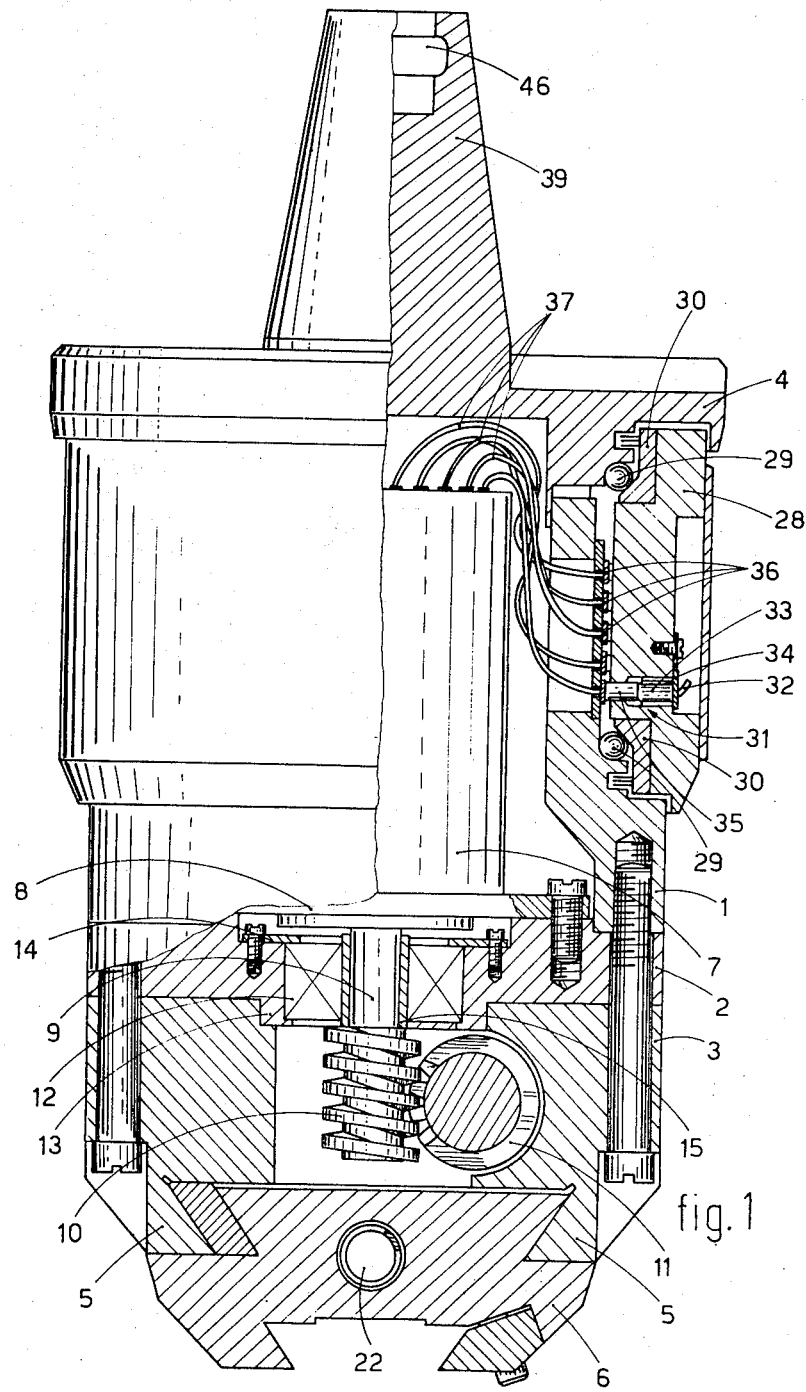
FIG. 1 is a side view, partly in section, of the device embodying the invention.

In FIG. 1, the inventive holding device includes a body 1 of approximately cylindrical outer configuration. A flange 2 and a box 3 are bolted to the bottom of body 1. A coupling member 4 is located at the top of body 1. The body 1 is joined to the other components by any suitable manner, for instance by means of screws, as shown in FIG. 1. A pair of dovetail-shaped guides 5 which is provided in the lower portion of the box 3, slideably support a slide 6 on which a machining tool is to be mounted.

An electric stepping motor 7 is fastened to the flange 2, in any suitable manner. For example, a collar 8 which is provided on the motor 7, can be fastened to the flange 2, by means of screws. One end of the shaft 9 of the electric motor 7 is provided with a worm screw 10, which is integral with the shaft. Worm screw 10 is coupled to a corresponding worm wheel 11. Preferably, but not necessarily, the deteriorating effect of the radial thrusts applied to the shaft 9 by the worm wheel 11 can be reduced by providing shaft 9 with a thrust bearing 12. In the example shown in FIG. 1, this bearing is a ball bearing and its outer race is locked against a shoulder 13, by means of a ring 14 secured by screws to the flange 2, while the inner race of the bearing rests upon a bushing 15, which is shrunk directly onto the shaft 9.

Figure 2:
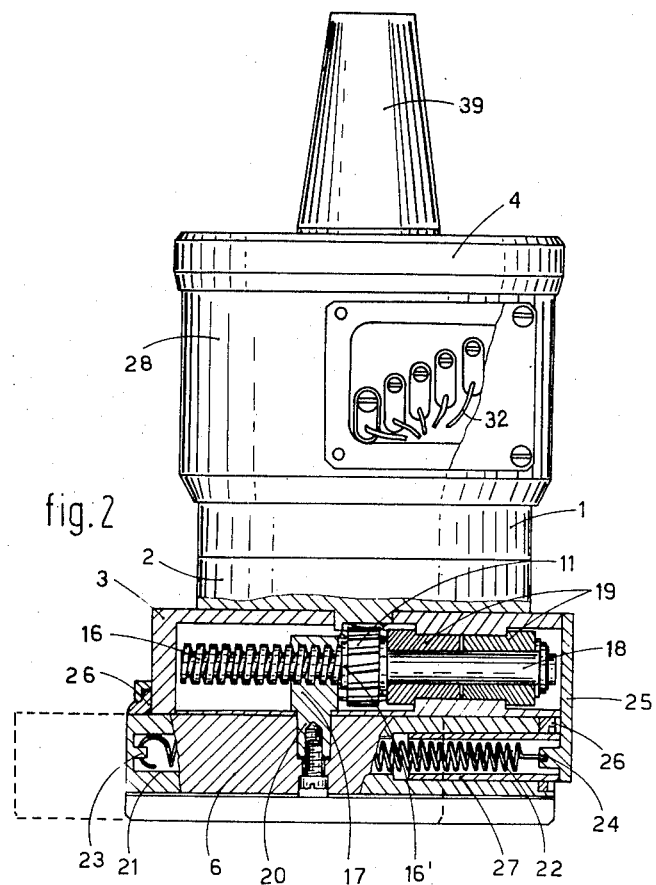
FIG. 2 is a side view, taken perpendicular to FIG. 1 and partly in section, of the device of FIG. 1.
Figure 3:
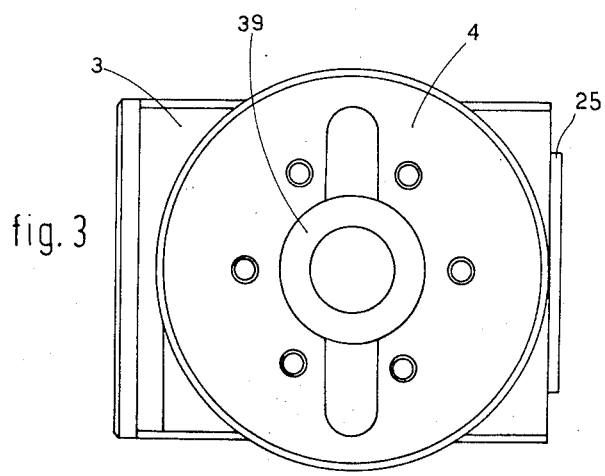
FIG. 3 is a plan view of the device of FIG. 1.

As shown in FIG. 2, the radial movement of the slide 6 with respect to the box is effected by use of a screw 16. Screw 16 is integral with the worm wheel 11 and cooperates with a nut 17 to which the slide 6 is fastened. The portion of the shaft on which the screw 16 is provided, is cantilevered and therefore is free at one end (the left as shown in FIG. 2). The screw 16 is separated by the worm wheel 11, from a smooth portion of the shaft which is rotatably supported by a pair of bushings 19.

The slide 6 (FIG. 2) is provided with a socket which houses a protruding part 20 of the nut 17 to which it is fastened, for instance by means of screws. Slide 6 also has a longitudinal bore 21 inside of which a spring 22 is housed. One end of the spring 22 is secured, as at 23, to the front side of the slide 6, while the other end of spring 22 is fastened, as at 24, to a small plate 25 which serves to close the box 3 at the back. The bias exerted by the spring 22 pulls slide 6 toward plate 25 and therefore ensures an efficient taking up of backlash in the coupling between the screw 16 and the nut 17.

On the end of the screw 16, facing towards the worm wheel 11, a ring-shaped collar 16' is provided. The nut 17 abuts against collar 6 before starting a machining cycle; therefore, this mechanical abutment serves in attaining the zero setting (set-point) of each cycle.

Preferably, packing 26 and a cylindrical casing 27 prevent any foreign particle from entering bone 21 and from entering between the surfaces of the slide 6 and of the box 3, which are movable with respect to one another.

As shown in FIG. 1, the body 1 is rotatably mounted in a support annulus 28 by means of two sets of balls 29, each of which is seated in a seat, provided in the coupling member 4 as well as in seat provided in a ring 30 inserted on the annular support 28. By suitably adjusting the axial position of the coupling member 4 with respect to the body 1, it is possible to adjust the clearances between the balls and seats.

The electric motor 7 is a reversible step motor. Consequently, the motor 7 is provided with four windings which, upon energization according to a predetermined sequence, will produce rotation by steps in a first direction. A stepped rotation in the opposite direction is produced by energization according to another sequence. The control circuit is connected to the electric motor 7, through the annular support 28. Five contact elements 31 which are connected with as many electric leads 32 are supported by support 28. Each of the contact elements 31 includes a small plunger of metal 33 which is urged by a leaf spring 34 against a slip ring 36 through a small plunger 35. The leaf spring 34 are fastened at one end to the annular support 28. The plunger tips 35 are made of a low coefficient of friction and high electrical conductivity material. The slip rings 36 are fastened to the body 1 of the holding mechanism and also are made of a highly conductive material.

Four of the slip rings 36 are electrically connected, by means of four leads 37, to the four windings of the electric motor 7. The fifth ring is used for the common return connection of the windings.

Figure 4:
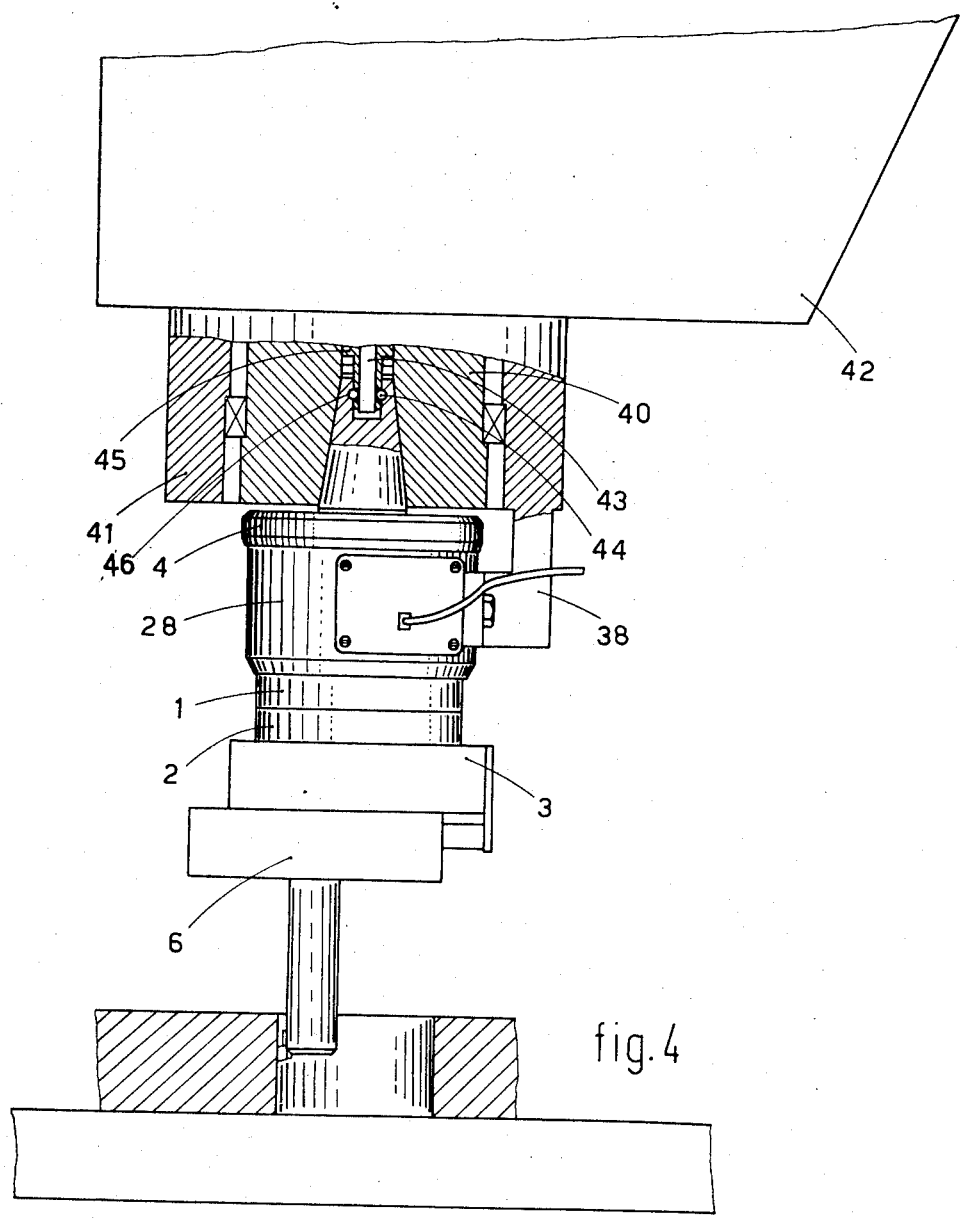
FIG. 4 shows the device mounted on a spindle of a machine tool, for machining a hole.

The assembling of the tool holding device on a machine tool can be accomplished by utilizing any conventional system. For example, as shown in FIG. 4, the tapered shank 39 which is integral with the coupling member 4, is inserted into a corresponding recess which is provided in the machine spindle 40. Spindle 40 is rotatably mounted inside a casing 41 and casing 41 is axially movable, that is vertically as shown in FIG. 4, with respect to an operating head 42 of the machine tool. The casing 41 is integral with an arm 38, to which the annular support 28 is fastened by means of screws (not shown). In order to mount the tapered shank 39 firmly in the corresponding recess of the spindle 40, any conventional device can be used. The example shown in FIG. 4, includes a pin 43 which is adapted to urge the balls 44, carried by a bushing 45, into a corresponding annular recess 46 provided inside the tapered shank 39. The transmission of the torque from the spindle 40 to the tool holding device can be effected by the use of keys of any suitable kind, now shown, or by any other desired means.

The control circuit for the embodiment of FIG. 1 is shown in FIG. 5. The control circuit includes a plurality of pulse generators, and is designed so that a machining cycle is started and completed in a fully automatic manner.

The FIG. 5 embodiment which is preferable but exemplary embodiment includes three pulse generators $G$, $G_1$ and $G_2$.

The two generators $G_1$ and $G_2$ apply their pulses to a sequence generator GS, which is adapted to control the sequence of the operation of each working cycle of the machine, as will be explained below. The output of generator GS controls a power circuit P which energizes the motor 7. Generator G1 provides a rapid pulse rate so that motor 7 is stepped rapidly. This provides for rapid approach of the tool to and from the workpiece. Generator G2 provides a slower pulse rate and a consequent slower stepping of motor 7. This provides a of the tool which is suitable for the machining operation.

The output of the power circuit P is also fed to the third pulse generator G, the output of which is applied to a counter C. Counter C counts the pulses received from pulse generator and compares them with the dimensions set into the manually operated dimension setting devices $I_1$, $I'_1$ and $I_2'$ $I'_2$, which will be described in detail below.

The control circuit also includes two flip-flops, $F_1$ and $F_2$. The flip-flop $F_1$ is controlled by the OR gate circuits $A_1$ and $A_2$, through the AND gate circuit $A_{12}$, which is energized by the OR gates A1 and A2. The two inputs to OR gate A1 and "IN" which represents the voltage for backing the tool away from the workpiece and "AV" which advances the tool to the workpiece. The two inputs to OR gate A2 are "cycle" which is presented to start an automatic cycle and "MP" which allows manual operation. Because AND gate A12 has its two inputs connected the OR gates A1 and A2 to realize an output from AND gate A12. During this condition flip-flop F1 energizes pulse generator G1 and rapid stepping of motor 7 is effected. In the active condition flip-flop F1 energizes AND gate MA and pulse generator G2 can be actuated.

The output of AND gate A12 is connected to one of the inputs of the flip-flop F1. The other input of flip-flop F1 is connected to the output terminal of OR gate $A_3$. The OR gate $A_3$ is actuated by a signal from a gate circuit $C_1$, which will be described below. The OR gate $A_3$ resets flip-flop $F_1$ to its starting position in accordance with signals received from the manual set circuits $I_1$, $I_2$, $I'_1$ and $I'_2$ through gates C1, C2 and C'1. The signals from $C_1$, also actuate the second flip-flop $F_2$, through OR gate M1. The output of OR gate M1 energizes the slow pulse generator $G_2$ through AND gate M2.

The output of counter C is connected to four gate circuits $C_1$, $C_2$, $C'_1$ and $C'_2$ the operation of which pends on the settings of hand operated dimension setting devices, as will be explained in detail below.

In particular, the output of the gate circuit $C_2$ is fed flip-flop F2 through an OR gate M3. Gate C2, therefore, resets the flip-flop F2 to its starting position in accordance with signals preset into the manual setting device $I_2$.

The control circuit also includes three potentiometers PS, P1 and P2. These potentiometers are manually set and are connected to a voltage source, not shown. Potentiometer PS controls the dwell time between two subsequent machining cycles. Potentiometers P1 and P2 actuate the slow pulse generator G2 through two "AND" gates L1 and L2 respectively and therefore control the travel speed of the slide 6 during the machining operation.

A special circuit, including the switch T actuates the parallel "AND" gates B1 and B2. The switch T and AND gates B1 and B2, therefore, control sequence generator GS. Sequence generator GS also receives an input from OR gate B3. The forward and reverse signals i.e. "AV" and "IN" respectively, actuate gates B1, B2 and B3. Direct or manual control of motor 7 can, therefore, be taken by closing switch T while either a forward or reverse signal is present. Switch T receives single pulses from a source of known configuration.

The control circuit also includes the AND gate circuits A4 and A5 and OR gate M4. The two AND gates A4 and A5 connect the potentiometer PS to the fast pulse generator G1 and, therefore control the interval of time between two working cycles. The OR gate M4, is connected to the manually operated dimension setting devices I2, I'2.

In operation the holding device is first mounted in the spindle 40 which is carried by the casing 41 of the operating head 42 of the machine. After inserting the tapered shank 39 into the corresponding recess of the spindle 40 the shank is locked. Axial locking is accomplished by means of the device described above, and torsional locking is accomplished by means of keys, for example. The annular support 28 is then secured to the arm 38 of the operating head 42, in the manner shown in FIG. 4. The leads 32 are then connected to the electric control circuit and the device is ready for fully automatic operation.

A current pulse is fed to the stepping motor 7 from the control circuit. The motor 7 then rotates the shaft 9 (FIG. 1) and the worm screw is connected to the shaft. The rotational movement of worm screw 10 is transmitted to the worm wheel 11 and to the screw 16 which is integral therewith (FIG. 2). Because the screw 16 cannot be displaced axially, the rotatory movement thereof causes an axial displacement of the nut 17 and therefore of the toolslide 6 which is coupled to the nut 17. With the use of normal values of the geometrical parameters of the screws 10 and 16 and of the worm wheel 11, and by employing a stepping motor which produces a rotation of 1.8° for each current pulse, a displacement by 0.005 mm of the slide 6 with respect to the box 3 is obtained. Therefore, a variation of 0.01 mm in the diameter of a bore machined by the tool is obtained. It should be noted, however, that operations other than boring are possible and are within the scope of the invention.

The current pulses are applied to the electric motor 7 by means of one of the pulse generators G1 and G2 contained within the control circuit. The control circuit is capable, as fully explained above, of controlling the holding device so that it performs a predetermined machining cycle in a fully automatic manner. Additionally, because of the control circuit configuration the tool holding device according to the invention can be set to two different groups of machining dimensions. Each of the two groups includes a first, or approach, dimension which is reached by rapid displacement of the tool and a second, or machining, dimension which is reached by a slow displacement of the tool. The possibility of setting two different groups of dimensions affords the advantage of enabling the operator to set the second group of machining dimensions during the period of time during the first group is being machined.

The two pulse generators G1 and G2 respectively controlling the rapid, or placement, movement and the slow or, machining movement, energize the stepping motor 7 through the sequence generator GS. The sequence generator memorizes the desired sequence of forward (AV) and backward (IN) movements. The manually operated dimension setting devices are used for setting the two dimensions of the first group I, (rapid displacement or approach) and I2 (slow or machining displacement) and the two dimensions of the second group I'1 (rapid displacement and I'2 (machining displacement), are controlled by the counter C. Pulses which are synchronous with the stepping pulses are applied through the pulse generator G to the Counter C. These pulses are thus counted, and compared in the manual setting devices $I_1$, $I_2$ and $I'_1$ and $I'_2$ with the dimensions previously set in the devices. A two-position generator which has a manual and an automatic control generates a signal SQ when it is in a first position. The generator is of known type, as are the other circuits used within the control circuit and, therefore is not shown. The SQ signal actuates the displacements set into the setting devices $I_1$ and $I_2$. A signal $\overline{SQ}$ is generated when the two position generator is in the second position. The $\overline{SQ}$ signal actuates the displacements set into the setting devices $I'_1$ and $I'_2$.

The coincidence of the movement signal "AV", or "IN" and a "Cycle" starting signal on OR gates A1 and A2 respectively actuates AND gate A12. The output of AND gate A12 actuates the flip-flop F1, which then energizes the rapid pulse generator G1. The output of pulse generator G1 is applied to stepping motor 7 through sequence generator GS and power circuit P. The pulses applied to the stepping motor 7 are applied to counter C through pulse generator G. The pulses are therefore counted by the counter C.

In the presence of the SQ signal, the AND gate circuit C1 compares the count in C with the dimension set on $I_1$. Upon attainment of this dimension, the AND gate $C_1$ generates a signal which resets the flip-flop $F_1$ and switches the second flip-flop $F_2$ through OR gate M1. The second flip-flop F2 then energizes the pulse generator $G_2$ through AND gate M2. The pulses generated by pulse generator G2 are also applied to motor 7 and counter C through sequence generator GS and power circuit P. The setting of potentiometer $P_1$ determines the pulse repetition frequency of the pulse generator G2 and therefore the travel speed of the holding mechanism. The pulses are counted by counter 10 through pulse generator G. The count is compared with the dimension set on I2 and, when this dimension is reached, and an SQ signal is present the AND gate circuit $C_2$ generates a signal which resets the flip-flop F2. The circuit $C_2$, then acts through the OR gate M4, to enable the AND gate A4 and thereby inhibit the pulse generator G1 for a period determined by the setting of the potentiometer PS. The time during which the tool will remain at the dimension set is thus determined. It is therefore possible to establish the length of the workpiece portion on which maching to a predetermined dimension is to be made. After all dimensions set into the $I_1$ and $I_2$ manual devices are attained and $\overline{SQ}$ signal starts a new cycle which utilizes the other group of dimensions set into the $I'_1$ and $I'_2$ devices. The stepping motor 7 is now controlled by the gate circuits $C'_1$ and $C'_2$ and by the potentiometer $P_2$.

As can be seen from the circuitry shown in the drawings, it is also possible to obtain a direct control of the motor by feeding single current pulses by means of the switch T, or gates $B_1$ and $B_2$, and sequence generator GS to motor 7. The slide 6 can be moved in this manner when a signal MP is present on one of the inputs of the gate circuit $A_2$.

The settings which are manually set into the setting device I1, I2, I'1 and I'2 correspond to the distance of the tool from the workpiece and, therefore, offset the variations occasioned by tool lengths, etc. The SQ and $\overline{SQ}$ signals are received from the memory device, for example, a tape, of the numerical control equipment. It is also to be noted that throughout the description the inputs are referred to as pulses. This is done because the device is intended to operate from digital controls.

What we claim is:

1. A tool holding device for a boring and facing machine comprising:
    a rotatable body member mounted on said machine,
    a tool slide carried by said body member and movable radially with respect to said body member, said tool being secured to said slide,
    a reversible electric motor fixedly mounted on said body member for moving said slide radially, said motor being of the type rotatable step-wise in response to pulsed signals corresponding to the number of steps of rotation and having a shaft coaxial with the axis of rotation of said body member,
    a worm and nut assembly driven by said shaft and connecting said motor to said slide for imparting radial motion to said slide, said worm and nut assembly comprising:
    a nut fixed to said slide,
    a worm screw perpendicular to said nut and engaged therewith,
    a cylindrical portion integral with said worm screw and supported for rotation, said cylindrical portion being constrained against linear motion by at least one bearing mounted on said body member,
    a threaded portion on said shaft,
    a worm wheel secured to said worm screw between said worm screw and said cylindrical portion, said worm wheel being coupled to said threaded portion and driven thereby, and
    a control circuit for controlling said motor, said control circuit comprising at least one pulse generator for actuating said motor, a digital setting device connected to said pulse generator for energizing said pulse generator, and a direction control device connected to said pulse generator for defining the direction of rotation of said motor.

2. The tool holding device of claim 1 wherein said pulse generator rapidly rotates said motor,
    and further comprising a second pulse generator for less rapidly rotating said motor, and means for selectively switching control of rotation of said motor from one of said pulse generators to the other of said pulse generators.

3. The control circuit of claim 2 further including manual setting means for setting the magnitude and direction of rotation of said motor, said manual setting means including at least two operational modes which are sequentially completed so that said first mode can be changed to a third mode during the running of said second mode.

4. The control circuit of claim 3 further including a counter, said counter receiving the input to said motor, and the output of said counter being injected into said manual setting means so that said setting means actuates said switching means when the input to said motor equals the preset setting of said manual setting means.

5. The control circuit of claim 4 wherein said switching means includes a bistable switching circuit associated with each of said pulse generators, said bistable switching circuits being selectively actuated by the output of said manual setting means.

6. The control circuit of claim 5 further comprising; variable voltage input means to said pulse generators for controlling the rotational speed of said motor by controlling the pulse repetition frequency of said pulse generators.

7. The control circuit of claim 6 further including manual switching means for overriding said pulse generators to thereby enable manual control of said motor.

8. The fool holding device of claim 1 further comprising:
    a collar arranged on the end of said worm screw adjacent to said worm wheel, so that said nut can abut against said collar before starting a predetermined machining cycle.

9. The tool holding device of claim 1 further comprising:
    a support fixedly attached to said machine and coaxial with said body member, said support supporting said body member for rotation by means of a plurality of balls interposed between said body member and said support and coacting with seats integral with said support and said body member, a plurality of angular slip rings carried by said body member and connected to said motor, and a plurality of contact elements mounted on said support in alignment with said slip rings and in slidable contact therewith, said contact elements being connected to said control circuit, whereby said motor is energized through the coacting said slip rings and said contact elements.

10. The tool holding device of claim 9 wherein each of said contact elements includes a plunger radially slidable in said support and biased against one of said slip rings by a leaf spring.

11. The tool holding device of claim 1 wherein said setting device is set according to the dimension that said slide must attain with rapid approach displacement of the tool, and including a second digital setting device connected to a second pulse generator and settable in accordance with ion said slide must attain with slow machining displacement, said control circuit further including means for switching the energization of said pulse generators, and a variable potentiometer for controlling the pulse repetition frequencies of said pulse generators.

12. The tool holding device of claim 11 wherein said means for switching includes at least one flip-flop, adapted to be switched by means of a coincidence circuit controlled by its respective said setting device for rapid displacement, and including a counter arranged to count the pulses feeding said motor and to compare the counted pulses with the respective said setting device connected to the energized said pulse generator.

13. The tool holding device of claim 1 further comprising a second control circuit similar to said first control circuit, the said digital control devices of each of said control circuit being manually settable, and switching means for alternately connecting said pulse generator with said first and second control circuits to enable the setting of with id digital device during the period when the other said digital device is controlling said motor.

14. The tool holding device of claim 1 wherein said pulse generator directly feeds said motor to rotate said motor one step for each pulse so fed and said digital setting device is settable according to a predetermined number of pulses for energizing said pulse generator, and further comprising a counter connected to said pulse generator for counting pulses fed to said motor, and comparing means for comparing said predetermined number of pulses set on said setting device with the number of said pulses counted by said counter for controlling said pulse generator.

* * * * *